March 27, 1962     M. S. MISCHANSKI     3,026,899
VALVES
Filed Feb. 24, 1960     3 Sheets-Sheet 1
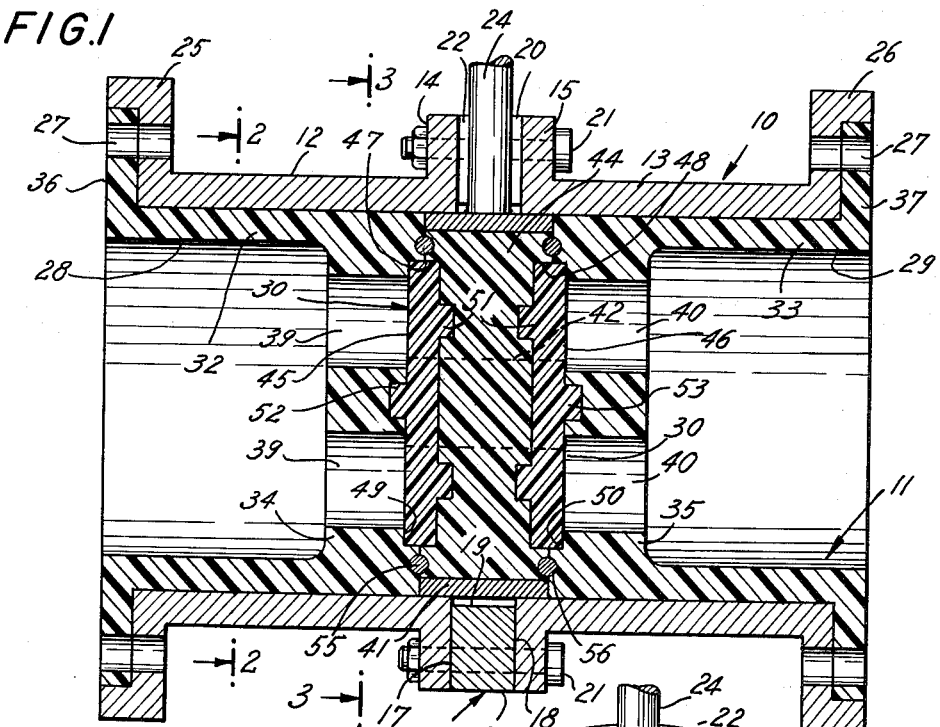
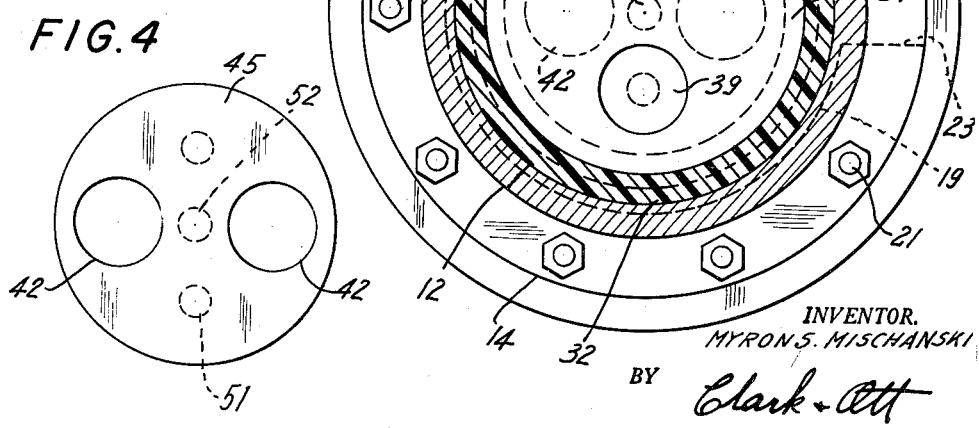
INVENTOR.
MYRON S. MISCHANSKI
BY Clark+Ott
ATTORNEYS March 27, 1962 M. S. MISCHANSKI 3,026,899
VALVES Filed Feb. 24, 1960 3 Sheets-Sheet 2

INVENTOR.
MYRON S. MISCHANSKI
BY Clark+Ott
ATTORNEYS

March 27, 1962    M. S. MISCHANSKI    3,026,899
VALVES
Filed Feb. 24, 1960    3 Sheets-Sheet 3
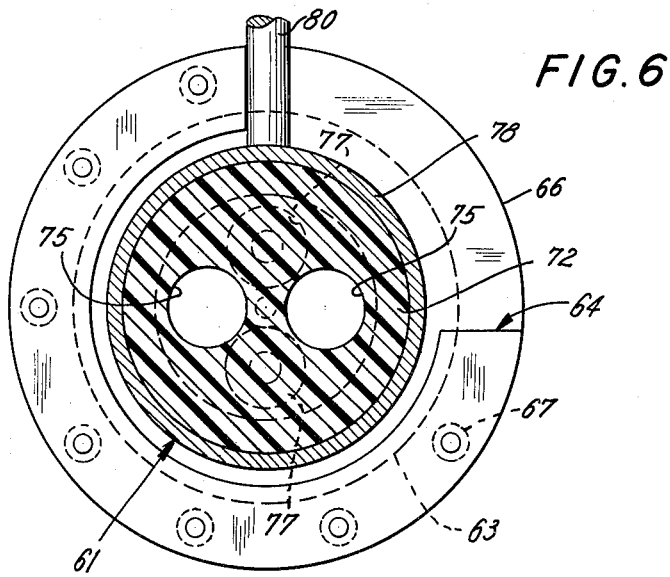
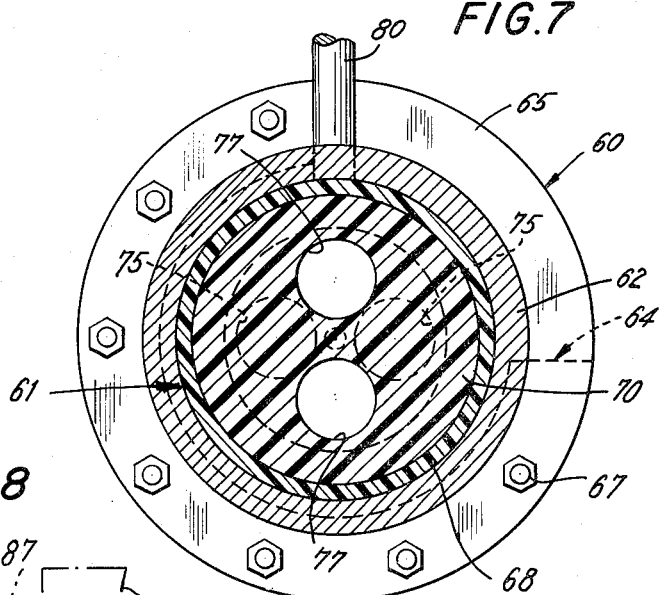
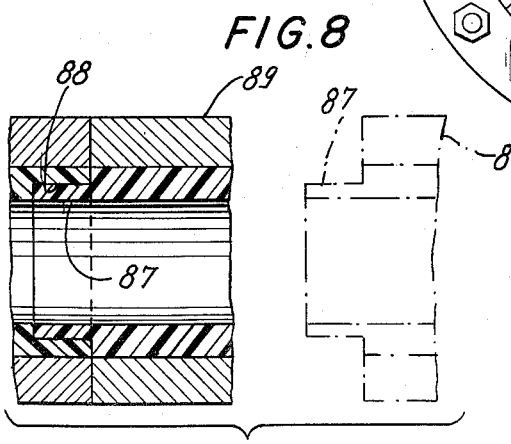
INVENTOR.
MYRON S. MISCHANSKI
BY Clark & Ott
ATTORNEYS

United States Patent Office 3,026,899
Patented Mar. 27, 1962

3,026,899
VALVES
Myron S. Mischanski, 27 Englewood Road, Clifton, N.J.
Filed Feb. 24, 1960, Ser. No. 10,613
4 Claims. (Cl. 137—375)

This invention relates to a valve which is particularly adapted for metering or regulating the flow of corrosive fluids.

An object of the invention is to provide a valve in which the parts subjected to the flow of the fluid are of a material which will withstand corrosive and other fluids normally deleterious to the common metals.

Another object of the invention is to provide a valve which is so constructed and arranged as to provide outer parts forming a strong metal casing and with inner parts of a material adapted to withstand the action of corrosive fluids.

There are materials which are weak in tensile strength at room temperature as compared with such common metals as steel and bronze and are further weakened with a temperature rise of as little as 50 degrees Fahrenheit. Other materials are brittle or very costly. On the other hand, some of these materials are resistant to corrosive fluids or are unaffected by contact with foodstuffs, medicinal preparations or liquids of a delicate composition. Organic plastics, thermoplastics or thermosetting plastics, hard rubber, fluorocarbon polymers, glass, lead and tantalum are examples of materials which resist corrosion but are weak in tensile strength, are brittle or are unduly costly. The present invention provides a valve of simple construction which presents smooth, unbroken surfaces of a corrosion-resistant material of any desired thickness and composition, firmly encased in a casing of a strong, inexpensive material. The valve provides quick, positive shut-off or partial reduction of flow at will. A valve of this construction is particularly useful in the chemical industry where bursting presents a hazard.

Still another object of the invention is to provide a valve having inner parts and a valve element of thermoplastic or other material adapted to withstand corrosive fluids and with the valve element arranged for arcuate turning movement for regulating or shutting off the flow of fluid therethrough.

Still another object of the invention is to provide a valve of said character in which the metal casing is made up of parts which may be readily disassembled for replacing worn parts.

With the foregoing and other objects in view, reference is now made to the following specification and accompanying drawings in which the preferred embodiments of the invention are illustrated.

In the drawings:

FIG. 1 is a longitudinal sectional view of a valve constructed in accordance with the invention and having flanged opposite ends.

FIG. 2 is a cross sectional view taken approximately on line 2—2 of FIG. 1.

FIG. 4 is a face view of one of the gaskets.

FIG. 6 is a cross sectional view taken approximately on line 6—6 of FIG. 6.

FIG. 7 is a cross sectional view taken approximately on line 7—7 of FIG. 5.

FIG. 8 is a fragmentary sectional view of one end of the valve and an adjacent fitting or piping connected by a slip joint and showing the fitting or piping in outline in separated juxtaposition.

Figure 3:
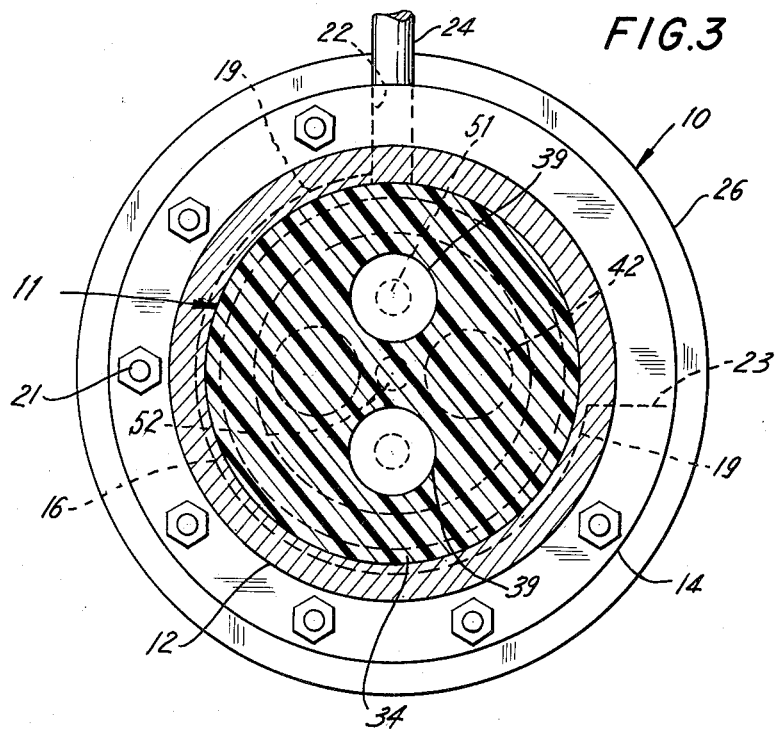
FIG. 3 is a cross sectional view taken approximately on line 3—3 of FIG. 1.

Referring to the drawings and more particularly to the form of the invention shown in FIGS. 1 to 4 thereof inclusive, the valve includes an outer metal casing 10 which surrounds inner valve parts 11 of a material adapted to withstand corrosive fluids.

The metal casing 10 is made up of parts which may be readily disassembled for replacing the valve element or parts thereof. As illustrated, the casing 10 includes tubular sections 12 and 13 which are formed with peripheral flanges 14 and 15 respectively at their inner ends and between said flanges is disposed a separator member 16 having parallel opposite side faces 17 and 18 and inner and outer peripheral faces 19 and 20 which conform to the peripheral formation of said flanges. The separator 16 is secured between the flanges 14 and 15 by bolts 21 or other fastening means extending through aligned openings therein for releasably coupling the said parts together. In the embodiment illustrated, the separator is of arcuate shaped formation of approximately 270° with the opening between the ends 22 and 23 thereof arranged to receive a handle member 24 therethrough for manually moving a valve element located within the casing. The casing may be of any desired construction for releasably connecting the same with piping or fittings at the ends thereof and, as illustrated, the sections 12 and 13 are provided with flanges 25 and 26 respectively which are formed with arcuately spaced apertures 27 for receiving bolts or equivalent fastening means for connecting the same with adjacent piping or fittings.

In order to provide a valve adapted to convey fluids which are normally corrosive to metals, the inner parts 11 are constructed of thermoplastic or other materials which will withstand corrosive fluids such as organic plastic, thermoplastics or thermosetting plastics, fluorocarbon polymers, hard rubber, glass, lead, tantalum and the like. The inner parts 11 cover the inner face of the casing 10 and include end sections 28 and 29 and a valve element 30 arranged between said sections. The end sections 28 and 29 are of similar formation and include peripheral walls 32 and 33, partition walls 34 and 35, and flanged outer ends 36 and 37 respectively. The partition walls 34 and 35 are arranged at the inner ends of the casing sections 12 and 13 respectively and are formed with a plurality of aligned flow openings 39 and 40 extending therethrough respectively, two openings being shown in the present embodiment but it is to be understood that the same may consist of any desired number. The flanged outer ends 36 and 37 snugly fit the recesses in the flanges 25 and 26 respectively. The end sections 28 and 29 may be formed by pressure molding or casting the material thereof in position in the casing sections 12 and 13 or the same may be pre-formed and cemented or otherwise secured in said sections.

The valve element 30 is in the form of an annular wall and is surrounded by a metal band 41 which tightly encases the outer periphery thereof and to which the handle member 24 is affixed. The valve element is mounted for rotation between the end sections 28 and 29 with the band 41 slidably engaging the inner faces of the casing sections 12 and 13 for opening and closing the valve. For this purpose the valve element is formed with a plurality of flow openings 42 which are disposed out of registry with the flow openings 39 and 40 when the valve handle 24 is disposed adjacent to the end face 22 of the separator 16 and is in registry with said flow openings 39 and 40 when the valve handle is disposed adjacent to the end face 23 of said separator. The said valve element 30 may consist of an inner annular portion 44 and opposite face portions or gaskets 45 and 46 and may be of any material having the desired resistance to corrosive fluids, low coefficient of friction and which is resilient to prevent leakage such as fluorocarbon polymers, resilient rubber composition and resilient plastics. The gaskets 45 and 46 are of general annular formation and are cemented or otherwise secured in annular recesses 47 and 48 in the opposite faces of said inner portion 44 and protrude beyond the inner portion 44 and slidably fit in annular recesses 49 and 50 in the end sections 28 and 29 respectively. In order to securely retain the said parts of the valve element in assembled relation, the gaskets are formed with inwardly directed lugs 51 which snugly fit in correspondingly shaped recesses in said inner portion 44. The gaskets are also formed with outwardly extending hubs 52 and 53 which rotatably fit correspondingly shaped sockets in the partition walls 34 and 35 respectively of the end sections 28 and 29. Outwardly of the gaskets, the valve element is provided with O-rings 55 and 56 on opposite sides thereof which snugly fit annular recesses in confronting faces between said inner portion 44 and the end sections 28 and 29. The flow openings 42 extend through the inner portion 44 and gaskets 45 and 46 of the valve element 30.

While the casing sections 12 and 13 are provided with flanged ends, the same may be screw threaded or have slip joint ends for connection with adjacent fittings or pipe line.

Figure 5:
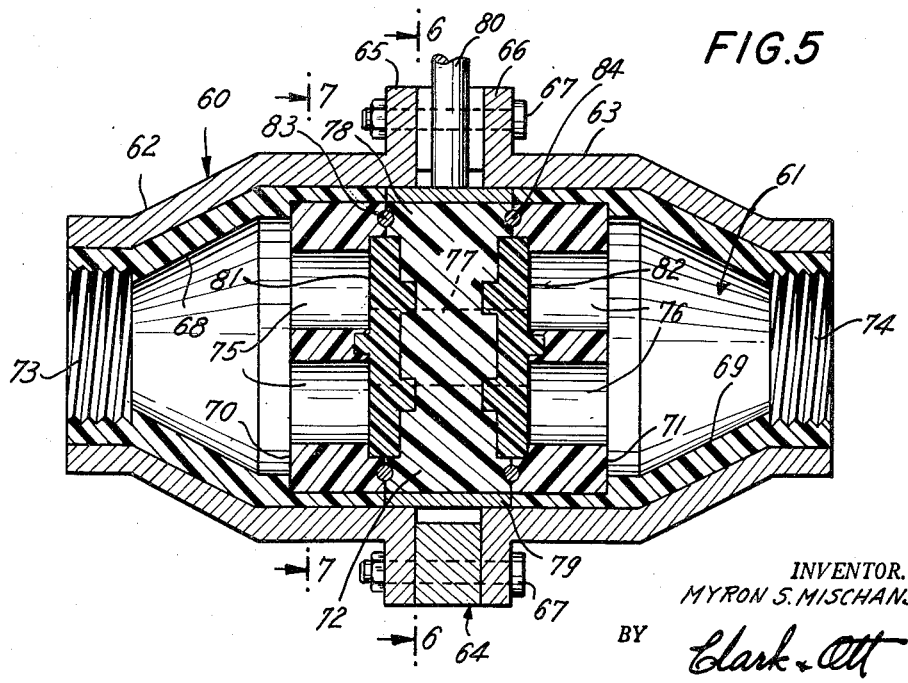
FIG. 5 is a longitudinal sectional view constructed in accordance with the invention and illustrating a modified form thereof.

In FIGS. 5 and 7 inclusive of the drawings, a modified form of valve is illustrated which includes an outer casing 60 and inner valve parts 61 adapted to withstand the flow of fluid normally corrosive to metals. In this form of the invention the casing 60 includes similar tubular casing sections 62 and 63 and a separator member 64 between said casing sections. The casing sections 62 and 63 have reduced outer ends and flanges 65 and 66 at their inner ends respectively. Bolts 67 extending through openings in said flanges and separator member secure the casing sections in assembled relation. The separator member 64 is similar to the casing section 16 in the previous form of the invention and is of arcuate shaped formation of approximately 270°.

The inner valve parts 61 include end sections 68 and 69 having partition walls 70 and 71 at the inner ends thereof respectively and between said partition walls is a valve element 72 rotatably mounted. In this form of the invention the end sections 68 and 69 are interiorly threaded as at 73 and 74 respectively but the outer casing sections 62 and 63 may be flanged as in the previous form of the invention or provided with slip joint ends. The end sections 68 and 69 conform in formation to the inner face of the casing sections 62 and 63 respectively and the same may be pressure molded or cast therein or may be pre-formed and cemented or otherwise secured in said sections. The partition walls 70 and 71 may be of annular formation as illustrated and cemented or otherwise secured in position at the inner ends of said inner sections or the same may be formed integrally with said end sections as illustrated in the previous form of the invention. The partition walls are provided with a plurality of flow openings 75 and 76 respectively and the valve element 72 is provided with a plurality of flow openings 77 which are adapted to align with the flow openings 75 and 76 in said partition walls when the valve is disposed in one position and to be out of registry therewith when the valve is disposed in another position. The valve element is similar to the valve element 30 in the previous form of the invention and includes an inner annular portion 78 which is surrounded and encased by a metal band 79 to which a handle member 80 is affixed. The valve element also includes opposite face portions or gaskets 81 and 82 similar to the gaskets 45 and 46 in the previous form of the invention.

The end sections 68 and 69, the partition walls 70 and 71 and the inner portion 78 of the valve element are constructed of materials which will withstand corrosive fluids as in the previous form of the invention such as organic plastics, thermoplastics or thermosetting plastics, fluorocarbon polymers, hard rubber, glass, lead, tantalum and the like while the gaskets 81 and 82 are constructed of any desired material which is resistant to corrosive fluids and has low coefficient of friction and is resilient so as to prevent leakage, such as fluorocarbon polymers, resilient rubber composition and resilient plastics. O-Rings 83 and 84 are arranged on opposite sides of the inner portion 78 of the valve element and snugly fit annular recesses in the confronting faces between said inner portion 78 and the end sections 68 and 69.

Instead of the flanged ends 25 and 26 or the interiorly threaded ends 73 and 74 in the previous forms of the invention, the valve may be recessed at its ends to provide a slip joint at each end of the valve. As shown in FIG. 8 fragmentarily showing one end of a valve constructed in accordance with the invention, the same is formed with a cylindrical recess 88 extending inwardly from the end thereof adapted to slidably and snugly receive a tubular extension 87 formed on the adjacent fitting or piping 89 with the valve and the adjacent fitting or piping disposed in abutting engagement and the interfitting parts cemented together.

Constructed in the manner shown in the aforesaid forms of the invention, a valve is provided which is adapted for shutting off or partial reduction of the flow therethrough and which will withstand high pressure without the likelihood of rupture due to the tensile strength of the outer casing and may be employed in connection with various types of fluids which are corrosive to metals.

While the preferred forms of the invention have been shown and described herein, it is to be understood that the same is not so limited but shall cover and include any and all modifications of the invention which fall within the purview thereof.

What is claimed is:

1. In a valve of the character described, a casing composed of a material having high tensile strength and including spaced tubular end sections and an intermediate section secured between the inner ends of said end sections and said casing having a transversely extending slot opening through the inner and outer peripheral faces thereof between said end sections, inner valve parts constructed of a material resistant to corrosive fluids and including a valve element and tubular walls secured as a lining against the inner faces of said end sections, said tubular walls having inner end walls disposed in spaced relation and between which said valve element is rotatably mounted, said valve element being of annular formation in transverse section through the valve and having a band of high tensile strength secured about the periphery thereof and closing said slot and with a handle projecting outwardly through the said slot between the inner ends of said end sections for manually rotating said valve element, each of said end walls having at least one flow opening, and said valve element having at least one flow opening disposed in alignment with the flow openings in said end walls for the flow of fluid through the valve when the handle is disposed in one position and with the flow opening in said valve element disposed out of alignment with the flow openings in said end walls to close off the flow of the fluid through the valve when the handle is disposed in another position.

2. In a valve of the character described, a metallic casing of high tensile strength and including spaced tubular ends and an intermediate arcuate section secured between the inner ends of said end sections and said casing having a transversely extending slot opening through the inner and outer peripheral faces thereof between said end sections, inner valve parts consisting of thermoplastic material resistant to fluids normally corrosive to the metal of which the casing is composed and including a valve element and tubular walls secured as a lining against the inner faces of said end sections, each of said tubular walls having an inner end wall arranged with said end walls disposed in spaced relation and between which said valve element is slidably mounted for rotation, said valve element being of annular formation in transverse section through the valve and having a metallic band of high tensile strength secured about the periphery thereof and closing said slot and which slidably engages against the inner face of said end sections of the casing, a handle secured to said band projecting outwardly through said slot between the inner ends of said end sections for manually rotating said valve element, each of said end walls having at least one flow opening, and said valve element having at least one flow opening disposed in alignment with the flow openings in said end walls for the flow of fluid through the valve when the handle is disposed in one position and with the flow opening in said valve element disposed out of alignment with the flow openings in said end walls to close off the flow of the fluid through the valve when the handle is disposed in another position.

3. In a valve of the character described, a metallic casing of high tensile strength and including spaced tubular ends and an intermediate arcuate section secured between the inner ends of said end sections and said casing having a transversely extending slot opening through the inner and outer peripheral faces thereof between said end sections, inner valve parts consisting of thermoplastic material resistant to fluids normally corrosive to the metal of which the casing is composed and including a valve element and tubular walls secured as a lining against the inner faces of said end sections, each of said tubular walls having an inner end wall arranged with said end walls disposed in spaced relation, said valve element being of anular formation in transverse section through the valve and having annular gaskets affixed thereto on the opposite side faces thereof, said valve element being arranged between said end walls with said gaskets slidably and frictionally engaging said end walls, a metallic band of high tensile strength secured about the periphery of said valve element and which closes said slot and slidably engages against the inner face of said end sections, means mounting said valve element for rotation between said end walls, a handle secured to said band projecting outwardly through said slot between the inner ends of said end sections for manually rotating said valve element, each of said end walls having at least one flow opening, and said valve element having at least one flow opening disposed in alignment with the flow openings in said end walls for the flow of fluid through the valve when the handle is disposed in one position and with the flow opening in said valve element disposed out of alignment with the flow openings in said end walls to close off the flow of the fluid through the valve when the handle is disposed in another position.

4. In a valve of the character described, a casing composed of a material having high tensile strength and formed with a transversely extending slot opening through the inner and outer faces thereof, inner valve parts constructed of a material resistant to corrosive fluids and including a valve element and tubular walls disposed as a lining against the inner faces of said casing from said valve element to the outer end thereof, said tubular walls having inner end walls disposed in spaced relation and between which said valve element is rotatably mounted, said valve element being of annular formation in transverse section through the valve and having a band of high tensile strength secured about the periphery thereof and closing said slot and with operating means connected with said band protruding through said slot for effecting rotation of said valve element, each of said end walls having at least one flow opening, and said valve element having at least one flow opening disposed in alignment with the flow openings in said end walls for the flow of fluid through the valve when the handle is disposed in one position and with the flow opening in said valve element disposed out of alignment with said flow opening in said end walls when the handle is moved to another position to thereby close off the flow of fluid through said valve.

References Cited in the file of this patent

UNITED STATES PATENTS

| 1,192,689 | Sayer | July 25, 1916 |
| 2,100,366 | Tyler | Nov. 30, 1937 |
| 2,893,684 | Williams | July 7, 1959 |
| 2,910,998 | Davis | Nov. 3, 1959 |

FOREIGN PATENTS

| 17,262 | Great Britain | Nov. 4, 1893 |